(No Model.)
H. EGGLESTON.
REEL SEAT FOR FISHING RODS.
No. 258,902.    Patented June 6, 1882.
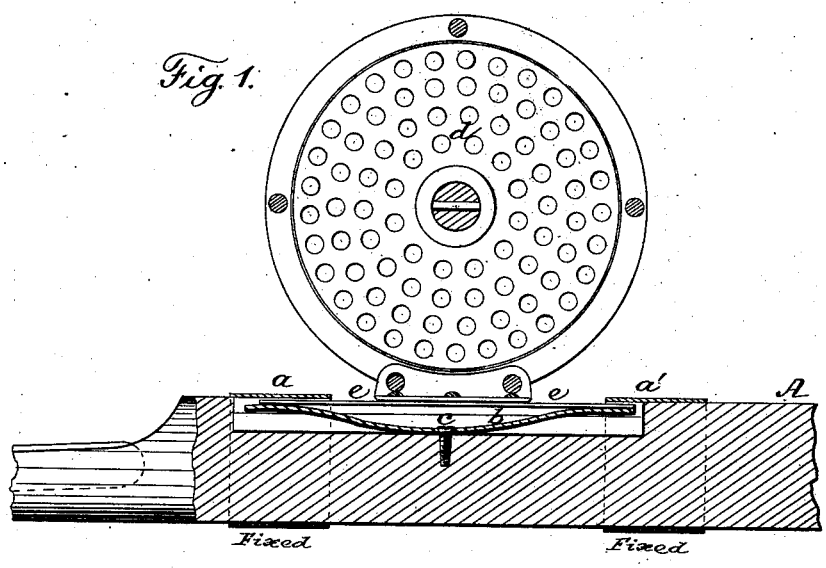
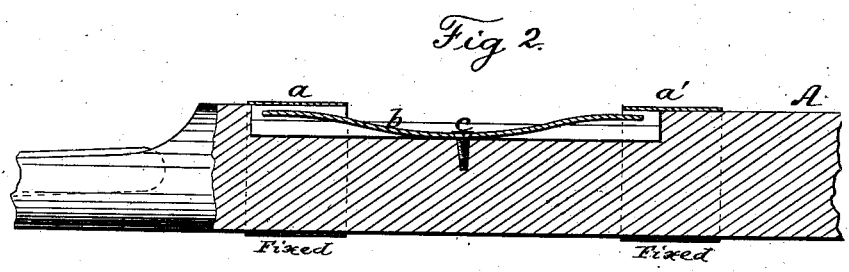
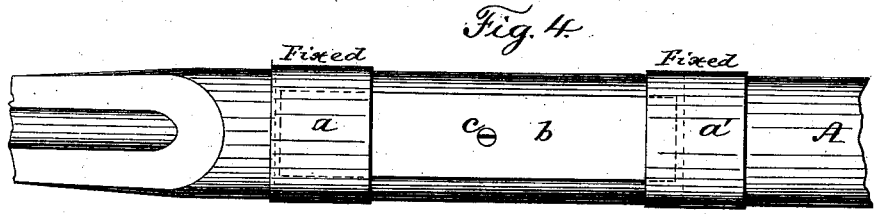
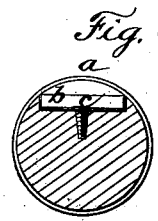
Witnesses:
Edmond Brodhag
Nowell Bartle
Inventor:
pro Hiram Eggleston
Johnson and Johnson
Attys
N. PETERS. Photo-Lithographer, Washington, D. C.

UNITED STATES PATENT OFFICE.

HIRAM EGGLESTON, OF MANCHESTER, VERMONT, ASSIGNOR TO CHARLES F. ORVIS, OF SAME PLACE.

REEL-SEAT FOR FISHING-RODS.

SPECIFICATION forming part of Letters Patent No. 258,902, dated June 6, 1882.

Application filed November 21, 1881. (No model.)

*To all whom it may concern:*

Be it known that I, HIRAM EGGLESTON, a citizen of the United States, residing at Manchester, in the county of Bennington and State of Vermont, have invented new and useful Improvements in Reel-Seats for Fishing-Rods, of which the following is a specification.

The line-reel of a fishing-rod is made detachable from its seat to secure its safety when not in use. For this purpose the usual fastening for the reel is a fixed and a sliding ring-band on the butt of the rod adapted to receive and fasten the ends of the seat-plate of the reel in the seat of the butt; but the sliding ring-band is liable to become loose, to fail in giving a firm clamping hold upon the reel seat-plate, and to slip from its fastening position.

The object of my improvement is to provide a simple and safe fastening for the reel, while allowing of its being readily fastened to and removed from the rod. For this purpose I use fixed ring-bands and a spring-seat as a fastening for the seat-plate of the reel, the spring serving as a seat for the reel and as a clamp for binding both ends of its seat-plate under the fixed ring-bands, between which and the said spring-seat the said reel seat-plate is inserted and removed by a sliding movement.

Referring to the accompanying drawings, Figure 1 represents a vertical longitudinal section of my improved reel-seat, the reel being shown as fastened; Fig. 2, a similar section, the reel being removed; Fig. 3, a cross-section of the same, and Fig. 4 a top view of the spring-seat.

The butt of the rod has a longitudinal excavation or recess, over and covering each end of which are fixed ring-bands *a a'*, and within which is secured a spring, *b*, or springs in such manner as to form a seat and a clamp for the seat-plate of the reel. The spring shown is a steel plate, secured by a screw, *c*, to the bottom of the recess, its ends curving outward and extending to or under the fixed ring-bands. The recess in the butt A extends nearly under the full width of the ring-band *a* and only partially under the other ring-band, *a'*, but such construction may be reversed, and its object will be presently stated. The ends of the plate-spring are shown as extending within that part of the recess covered by the ring-bands; but this is not a necessity, as the spring may serve its function of a seat and clamp for the reel seat-plate without extending under the ring-bands.

The reel *d* is provided with the usual seat-plate, *e*, such as is used with the fixed and the sliding ring-bands. The length of the reel seat-plate *e* must be greater than the space between the fixed ring-bands and less than the length of the recess in the butt, for the purpose of allowing it to be fastened upon its seat. This fastening is effected by placing the reel seat-plate upon the spring and inserting one end of said seat-plate under that ring-band, which extends its full width over the recess until the other end of said seat-plate is free of the other ring-band, and then sliding the seat-plate back upon the spring under said last-mentioned ring-band, thus binding the ends of said seat-plate to the fixed ring-bands and fastening the reel firmly to the butt.

To remove the reel, its seat-plate is slid within the fixed ring-bands, so as to free one end of its seat-plate, which is then drawn out of the other ring-band. The spring may have equal tension at each end, or one end may have greater tension than the other, if found necessary.

The sliding fastening-ring is objectionable, more particularly because when the rod becomes wet it swells, so that it is impossible to slide the ring to allow of the removal of the reel from its seat.

I claim—

In a reel-seat for fishing-rods, a spring-clamping seat, *b*, in combination with the rod having the fixed ring-bands, substantially as described.

In testimony whereof I have hereunto set my hand in the presence of two subscribing witnesses.

HIRAM EGGLESTON.

Witnesses:
 W. A. BLACK,
 W. P. BLACK.